(12) United States Patent
Eskandari et al.

(10) Patent No.: US 6,230,228 B1
(45) Date of Patent: May 8, 2001

(54) EFFICIENT BRIDGE ARCHITECTURE FOR HANDLING MULTIPLE WRITE TRANSACTIONS SIMULTANEOUSLY

(75) Inventors: Nick G. Eskandari; Bryan R. White, both of Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/283,929

(22) Filed: Apr. 1, 1999

(51) Int. Cl.[7] .................................................. G06F 13/00
(52) U.S. Cl. .............................. 710/129; 710/52; 710/56
(58) Field of Search .................................. 710/1, 52, 53, 710/56, 100, 129, 130

(56) References Cited

U.S. PATENT DOCUMENTS

| | | | |
|---|---|---|---|
| 5,694,556 | * 12/1997 | Neal et al. ........................... | 710/128 |
| 5,845,145 | * 12/1998 | James et al. ........................ | 710/1 |
| 6,047,339 | * 4/2000 | Su et al. ............................. | 710/129 |
| 6,070,209 | * 5/2000 | Hausauer ........................... | 710/129 |
| 6,108,741 | * 8/2000 | MacLaren et al. ................. | 710/129 |

* cited by examiner

*Primary Examiner*—Xuan M. Thai
(74) *Attorney, Agent, or Firm*—Blakeley, Sokoloff, Taylor & Zafman LLP (57) ABSTRACT

An embodiment of the invention is a bridge having a transaction queue for storing transaction information for each of a number of enqueued posted write transactions, a data queue for simultaneously storing transaction data for each of the enqueued transactions, the transaction data having been received through slave logic of the bridge to be delivered through master logic of the bridge, and a controller for managing the transaction and data queues in response to the transaction information, the bridge being further configured to dynamically allow the transaction data for a single enqueued transaction to occupy the maximum available space in the data queue.

17 Claims, 6 Drawing Sheets

EFFICIENT BRIDGE ARCHITECTURE FOR HANDLING MULTIPLE WRITE TRANSACTIONS SIMULTANEOUSLY

FIELD OF THE INVENTION

This invention is generally related to electronic systems having a bridge, and more particularly to bridge architectures for handling multiple write transactions simultaneously.

BACKGROUND

High performance electronic systems such as those used for computer network servers and mass storage applications often feature a number of physically separate buses that allow a greater number of peripheral devices such as network interface controllers and disk controllers to be part of the system. A bridge combines the two buses into one logical bus, so that a device on one bus can readily communicate with a device on the other bus through the bridge. Communication between two devices on opposite sides of the bridge occurs as follows. A device known as the initiator presents a request for a write or read transaction on an initiating bus. The request specifies the address of a target device on a target bus on the opposite side of the bridge. The bridge which is coupled between the initiating and target buses has been previously configured to recognize such a request.

A two part transaction occurs when the bridge claims the request on the initiating bus, and subsequently transports the transaction onto the target bus. For instance, with a posted write transaction, the bridge accepts a write data packet from the initiator, and then signals a termination to disconnect the initiator and end the transaction on the initiating side. The data packet is temporarily stored in a data queue of the bridge. When the bridge thereafter acquires the target bus in a new transaction, the data packet is forwarded from the queue to the target. In systems that comply with the popular Peripheral Component Interconnect (PCI) Local Bus Specification, Rev. 2.1, Jun. 1, 1995, the posted write transaction is normally a write to memory or a memory-mapped location. For further information on such transactions, the reader is referred to the *i960® Rx I/O Microprocessor Developer's Manual*, April 1997, Intel Corp. Order No. 272736-002, chapter 15, PCI-to-PCI bridge unit.

Typically, conventional PCI bridges have been designed so that only a single posted write transaction, in a given direction through the bridge, can be pending in the bridge. Such bridges are used in a variety of different system applications that may have different data traffic patterns. For instance, in a network server application, the bridge is faced with the task of forwarding a large number of data packets from one bus to another, where each data packet may be relatively small. On the other hand, a mass storage application generates much larger packets but less frequently.

The conventional PCI bridge is often optimized at the design stage to more effectively handle a particular system application by engineering the size of its data queue. Optimizing at the design stage creates a problem, however, because it requires a number of different bridge designs each being specifically optimized for a dedicated system application, thus substantially increasing the cost of manufacturing bridges. Therefore, what is needed is a universal design that allows a bridge to dynamically adapt to changes in data traffic encountered in different system applications. Such a design should also make efficient use of the bridge's data queue, because the queue is a high speed and silicon-intensive realization and is therefore a relatively expensive component of the bridge.

SUMMARY

Accordingly, an embodiment of the invention is directed at a method of processing multiple write transactions using a bridge by storing first transaction information for a first transaction in a transaction queue of the bridge, storing first transaction data for the first transaction in a data queue of the bridge, storing second transaction information for a second transaction in the transaction queue, the transaction queue simultaneously containing the first and second transaction information. The method entails storing second transaction data for the second transaction in the data queue, the data queue simultaneously containing the first and second data. The mastering of the first and second transactions involves forwarding the first and second data from the data queue to one or more targets. Also, third transaction data for a third transaction can be stored in the data queue, the third data occupying the maximum available space in the data queue.

Other features and advantages of various embodiments of the invention will be apparent by referring to the detailed description, drawings, and claims below.

DETAILED DESCRIPTION

An embodiment of the invention is directed at a method of using a bridge that includes a data queue which can be dynamically adapted to queue the data of multiple posted write transactions across the bridge, under variable data traffic conditions. The data queue is automatically configured to accept the transaction data for a number of posted write transactions, and where the data for a single transaction can occupy the maximum available space in the data queue. This design allows the bridge to easily adapt to different system applications. For instance, the data queue can hold the transaction data for several transactions, such as when many small data packets are being processed in a networking application. On the other hand, the data queue can just as easily store a single, large data packet for a single transaction, typical of storage applications. The embodiments of the bridge and methodology described below are particularly effective for PCI posted write transactions such as memory write and memory write and invalidate transactions, in the same direction across the bridge, where the transactions do not overlap and are mastered on a first in first out basis.

Figure 1:
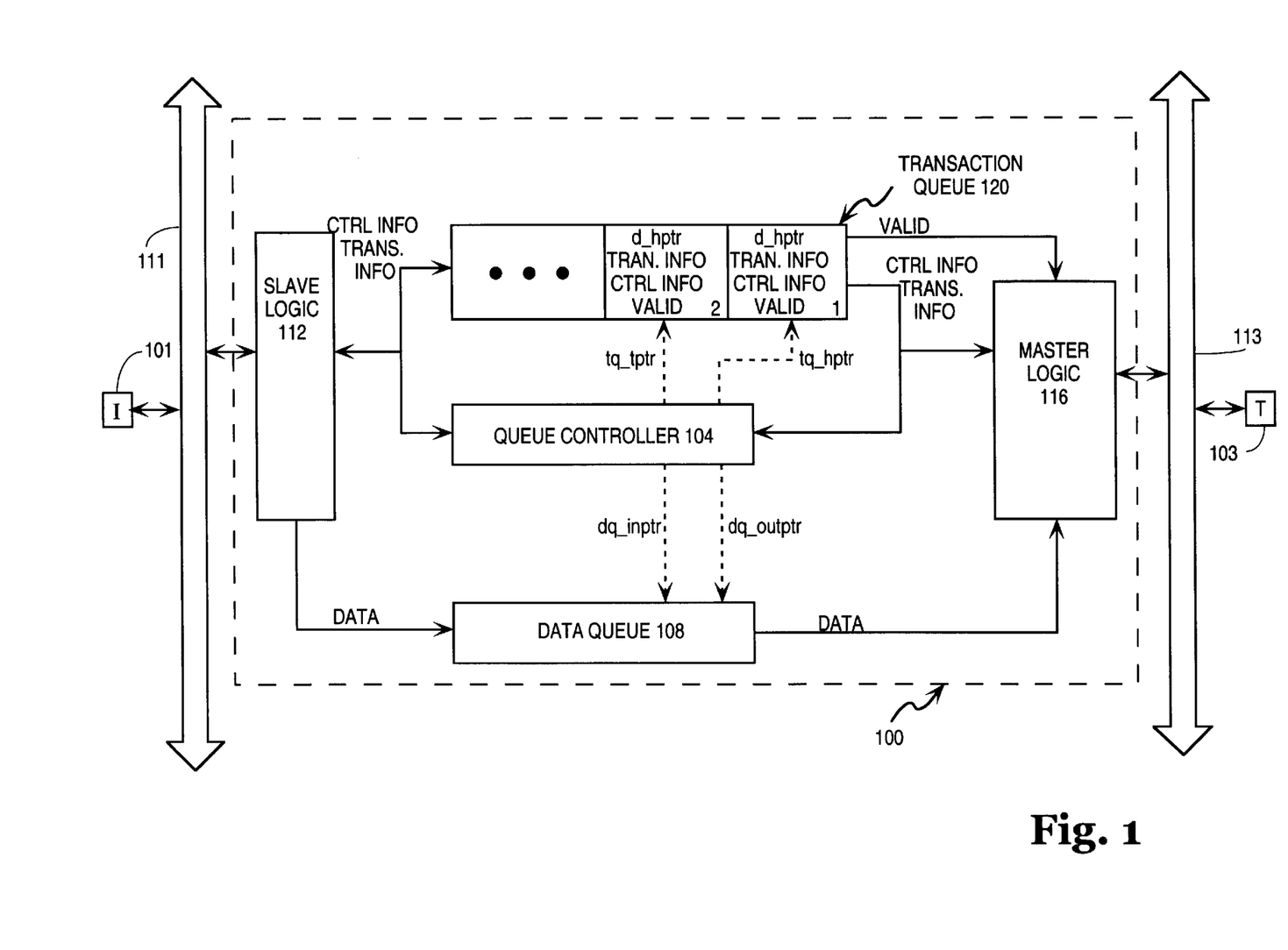
FIG. 1 shows a block diagram of a bridge according to an embodiment of the invention.

FIG. 1 illustrates a logical block diagram of a bridge 100 according to an embodiment of the invention. The bridge 100 comprises slave logic 112 on an initiating side and master logic 116 on a target side of the bridge. The slave logic 112 receives requests for transactions initiated on the initiating bus 111 and directed at a target on the target bus 113. The slave logic 112 comprises a bus interface for receiving the transaction requests, and a decoder that compares incoming addresses against address ranges stored in the bridge to decide whether to claim and forward a transaction, or ignore it. The decoder also determines whether to treat the transaction as a write or a read. The master logic 116 comprises a bus interface to the target bus 113. The master logic 116 is responsible for driving the addresses and data of an enqueued transaction onto the target bus 113.

Write data for each transaction is received by the slave logic 112 and stored in a data queue 108 before being delivered to the target bus 113 by the master logic 116. The data queue 108 is a buffer having a first in first out (FIFO) structure. The data queue 108 can simultaneously store the transaction data for each of a number of enqueued write transactions. An enqueued transaction is one for which transaction information has been captured by the bridge. The transaction information comprises at least the address of a target device on the target bus 113, and may also include the type of transaction, also known as the command type for the PCI embodiment of the invention. The enqueued transactions are referenced in a transaction queue 120.

The transaction queue 120 is a specialized buffer having a FIFO structure, similar to the data queue 108. The transaction queue 120 is divided into a number of slots numbered 1, 2, . . . as shown. Each slot is assigned to an enqueued transaction. A data head pointer (d_hptr) is stored in the slot associated with the transaction. The data head pointer (d_hptr) points to the beginning of the write data, in the data queue, for the associated enqueued transaction. Each slot in the transaction queue 120 holds the d_hptr, transaction information, control information, and a Valid bit associated with an enqueued transaction. The transaction information comprises at least an address of the target, and in addition may include command and parity information. The control information includes a "Posted" bit which, when set, indicates that the slave logic 112 is finished receiving data for with this particular enqueued transaction, i.e., the connection with the initiator of the transaction has been cut. The bit is used to remove transactions from the queue 120. While a transaction is being mastered and all of the enqueued data for this transaction has been transferred out, the bridge will normally terminate the transaction. Internally, the "posted" bit is used to determine if the transaction with which it is associated may be removed from the queue. If the posted bit is set, then the slave logic 112 is no longer receiving data for this transaction, such that the transaction may be removed once all of the enqueued data for the transaction has been transferred out of the bridge on its target side. If, however, the posted bit is clear, the slave logic is still connected and may be receiving data for this transaction, such that the transaction is not removed from the queue even if there is no more enqueued data for this transaction.

The Valid bit, when set, indicates that the data queue 108 contains valid data for this enqueued transaction, and that the transaction is therefore ready to be mastered. Additional control information, of course, may be provided in each slot to further facilitate the bridge's handling of more than one enqueued transaction.

A queue controller 104 manages the transaction queue 120 and the data queue 108 in response to transaction information and control information received from the slave logic 112. The queue controller 104 provides and manages a number of pointers to locations in the transaction and data queues. A transaction queue head pointer (tq_hptr) indicates the slot in the queue 120 which contains the information needed to master the oldest enqueued transaction. This oldest enqueued transaction may also be known as the current transaction being mastered by the master logic 116. A transaction queue tail pointer (tq_tptr) points to the youngest enqueued transaction. A data queue out pointer (dq_outptr) indicates the current portion of data in the data queue 108 to be delivered to a target. The tq_hptr and dq_outptr are used by the master logic 116 to master the oldest enqueued transaction. A data queue in pointer (dq_inptr) indicates the next available empty slot in the data queue 108. The slave logic 112 provides new transaction data which is stored beginning at dq_inptr. All of these pointers are updated as necessary when new transactions are received and old transactions are mastered. For instance, the dq_outptr is updated as portions of transaction data are delivered onto the target bus 113 by the master logic 116. Normally, slots in the data queue 108 and in the transaction queue 120 are released, i.e. made available for new data and new transaction information, as older transactions are mastered and completed.

Figure 2:
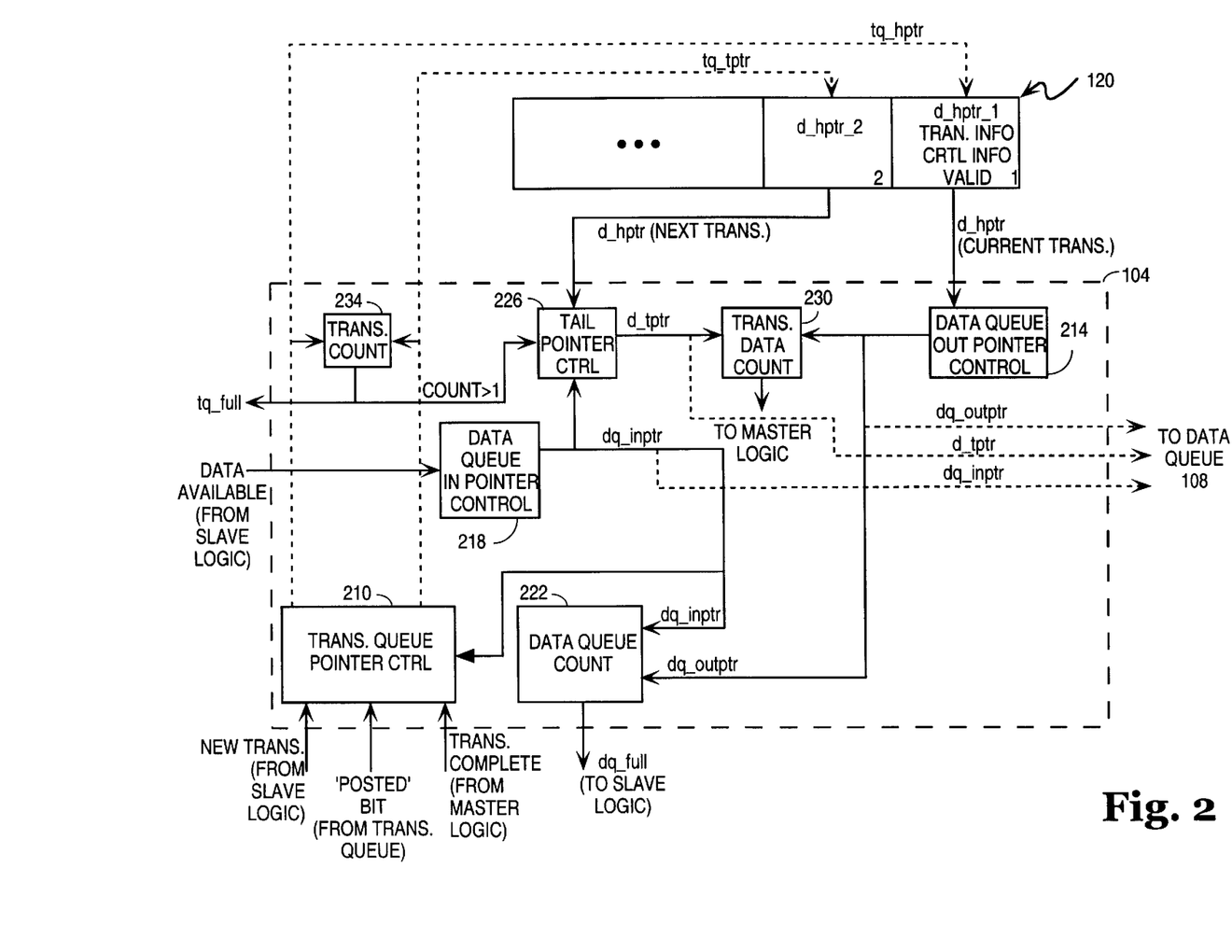
FIG. 2 shows a block diagram of a queue controller in the bridge coupled to a transaction queue.
Figure 3:
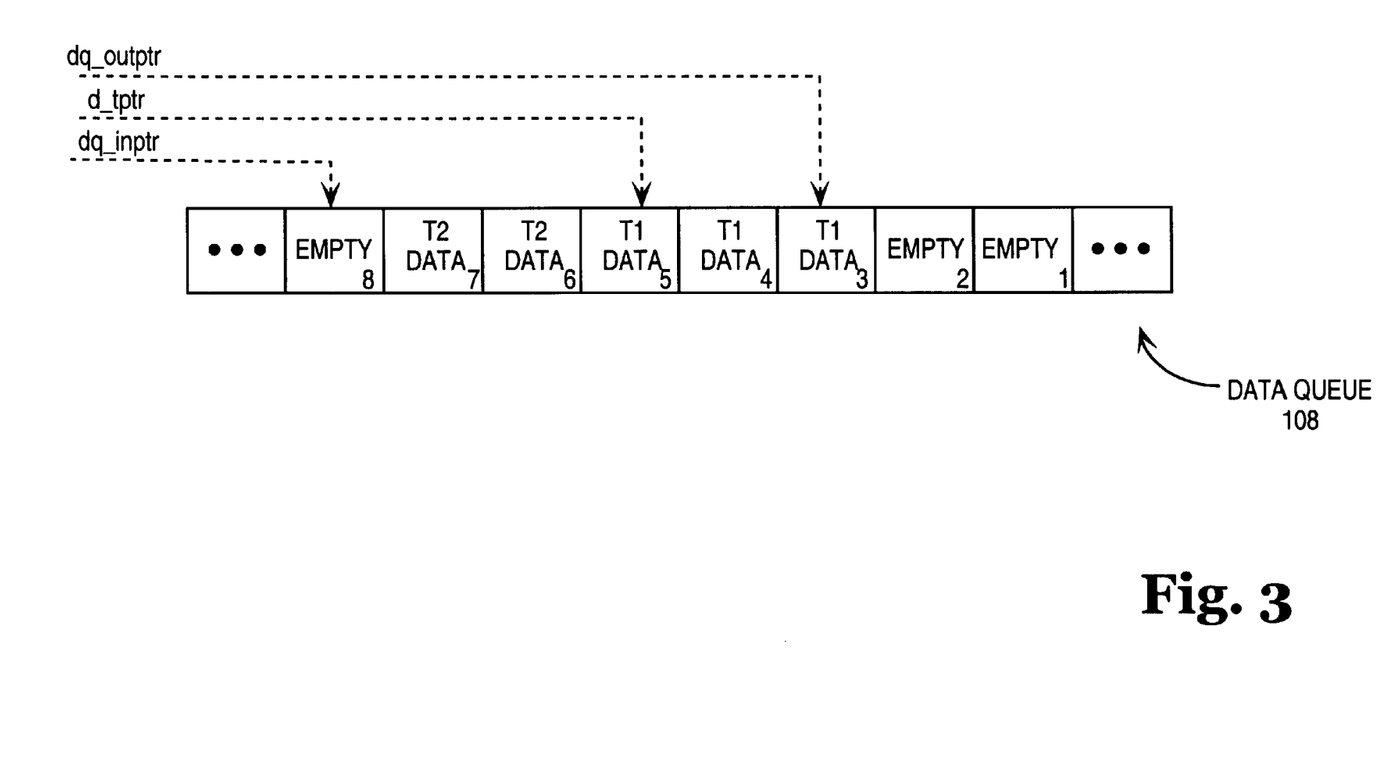
FIG. 3 shows a diagram of a data queue according to an embodiment of the invention.

FIGS. 2 and 3 illustrate further detail of the queue controller 104 and its interaction with the transaction queue 120 and data queue 108. A transaction queue pointer control block 210 generates the tq_tptr and tq_hptr in response to notifications received from the master and slave logic that new transactions are received and old transactions are completed. When the current transaction in slot 1 of the transaction queue 120 is removed from the transaction queue 120, the tq_htpr is accordingly adjusted to point to the next oldest transaction that has been enqueued.

A data queue out pointer control block 214 initializes dq_outptr whenever an enqueued transaction has been selected to be mastered. The initial value of dq_outptr is taken from d_hptr of the current slot in the transaction queue 120. A data queue in pointer control block 218 is responsible for updating dq_inptr in response to the data queue being filled with data from the slave logic 112. The dq_inptr and the dq_outptr are compared by data queue count block 222 to determine when the data queue 108 has become full, in which case no new requests for posted write transactions can be accepted by the bridge 100.

A tail pointer control block 226 provides d_tptr which indicates the end of the transaction data for the current transaction being mastered. The d_tptr is derived from dq_inptr if there is a single enqueued transaction in the transaction queue 120, and from the d_hptr of the next transaction, e.g., the d_hptr_2 in slot 2 of the transaction queue 120, if there is more than one enqueued transaction. Thus, in FIGS. 2 and 3, d_tptr would point to slot 5 of the data queue 108, while dq_outptr would indicate slot 3. A transaction data count block 230 compares the current d_tptr and dq_outptr values to determine whether all of the data associated with the current transaction has been delivered to the target device 103 through the master logic 116. An enqueued transaction may be removed from the transaction queue 120, i.e., the associated slot becomes available for storing new transaction information, in response to dq_outptr becoming equal to the current value of d_tptr, as determined by the transaction data count block 230.

For purposes of illustration and for easier explanation of bridge operations, only elements of the bridge 100 responsible for processing transactions in a single direction have been described. One of ordinary skill in the art will recognize that transactions initiated in the reverse direction, i.e., initiated on the target bus 113 and directed at a device on the initiating bus 111, may be processed using structure and operations which are similar to those described in this disclosure.

Figure 4:
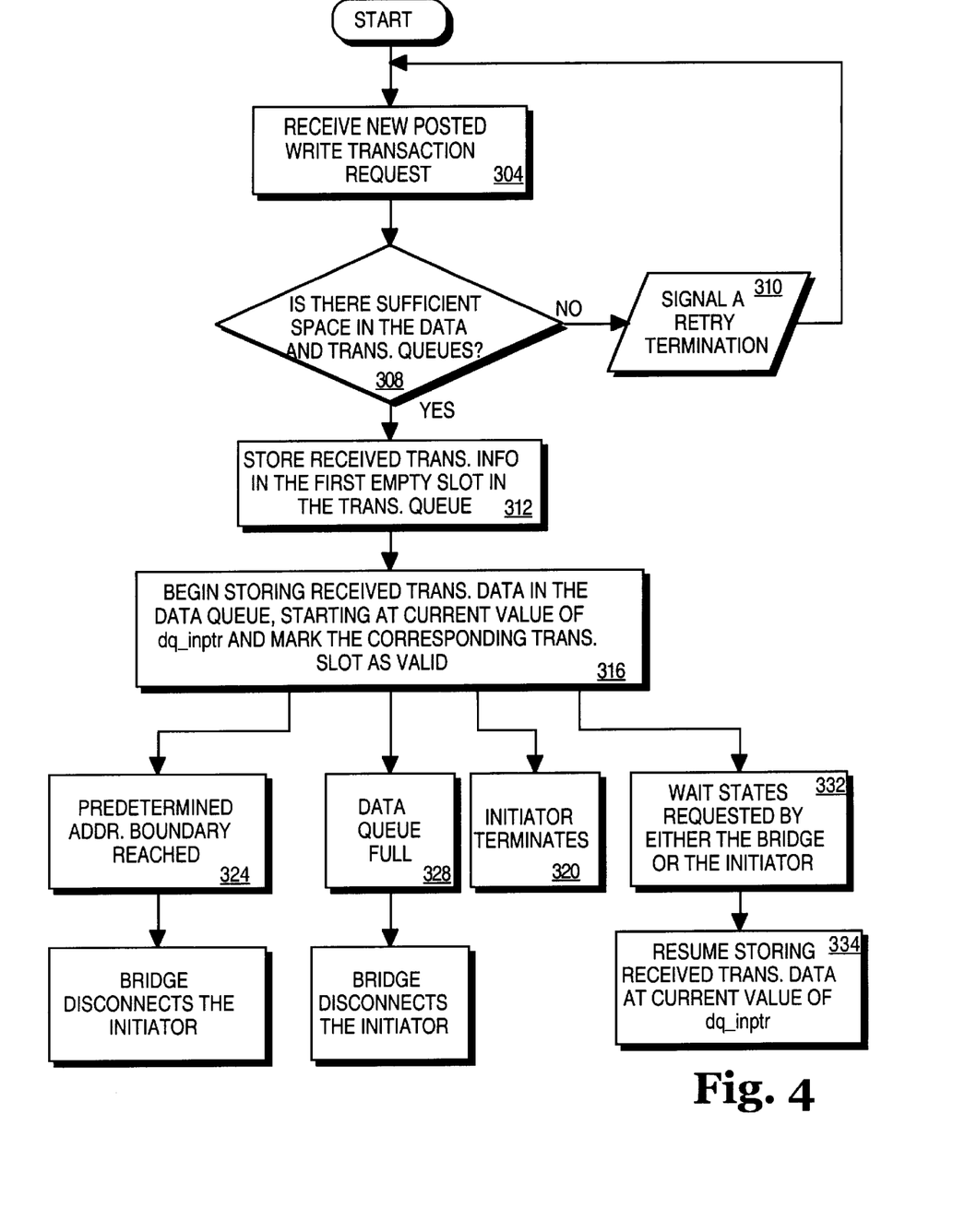
FIG. 4 illustrates a flow diagram of operations performed by the bridge and by the slave logic while accepting transaction information and data.
Figure 5:
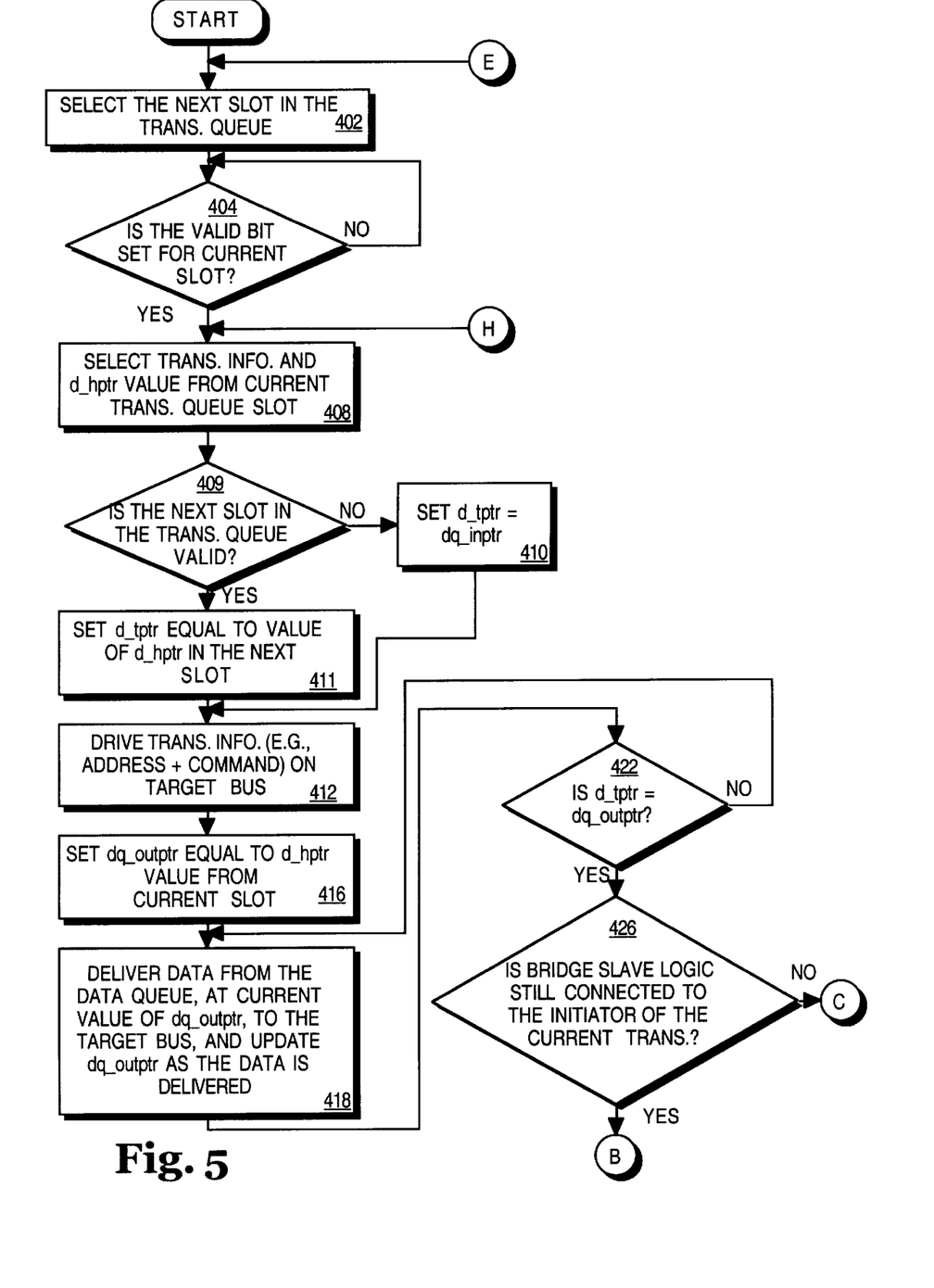
FIGS. 5 and 6 depict a flow of operations performed by the bridge while mastering a transaction.
Figure 6:
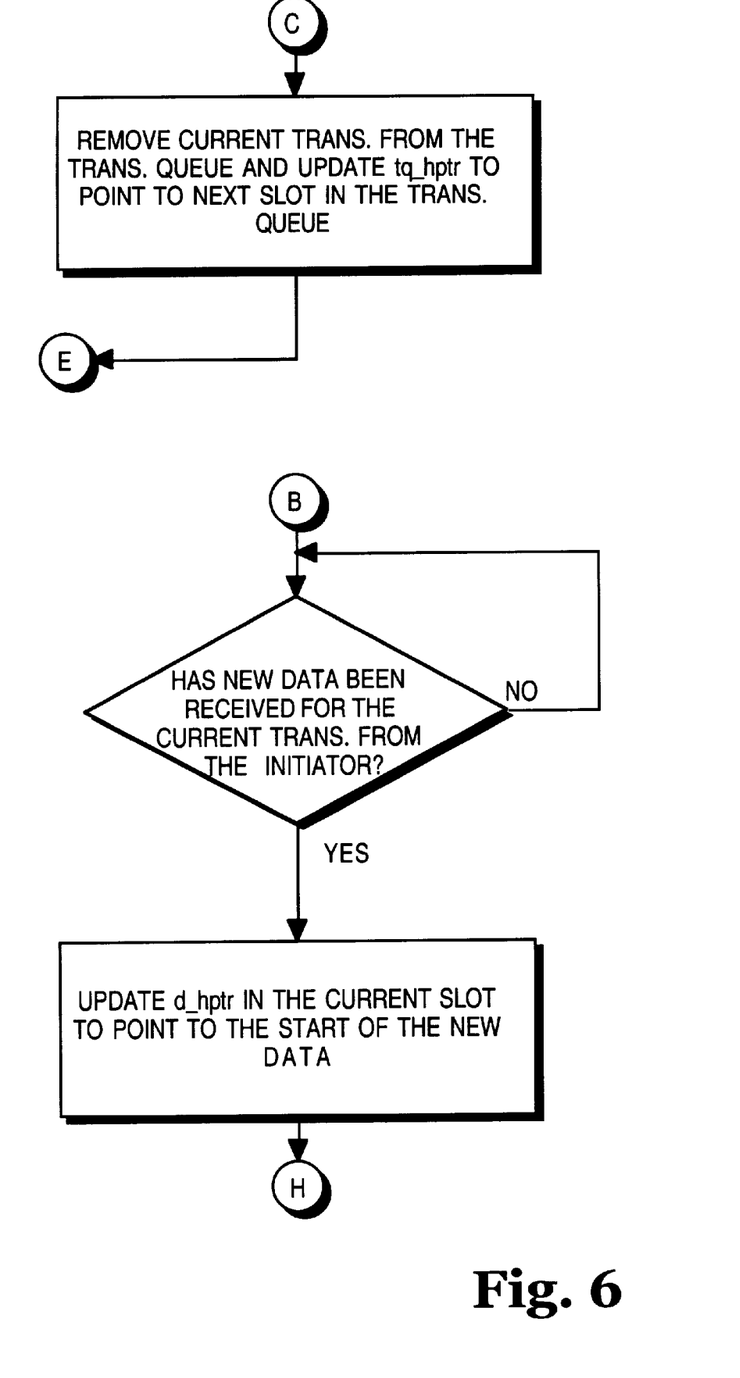

Having described an embodiment of the invention as architecture of the bridge 100, FIGS. 4–6 are now used to illustrate how the bridge 100 simultaneously processes a number of posted write transactions in the same direction. Operation begins in FIG. 4 with step 304 where a new posted write transaction is decoded by the slave logic 112. The bridge 100 then determines in step 308 whether there is sufficient space in both the data and transaction queues to accept this new transaction. Normally, sufficient space exists if both the transaction queue 120 and the data queue 108 have at least one empty slot. Otherwise, the slave logic 112 holds off the first bus 111. For example, in a PCI system, the slave logic signals a retry termination. The retry termination, in step 310, signals the initiator 101 to request the transaction again at a later time.

Assuming there is sufficient space in both the data and transaction queues, transaction information, including at least the address of the target device 103 and the command type, is transferred from the slave logic 112 and latched into the transaction queue 120. The transaction information is stored in an empty slot located behind the current value of tq_tptr, i.e., to the left as shown in FIG. 2, as in step 312. Also, the current value of dq_inptr is captured and assigned to d_hptr for this enqueued transaction, where dq_inptr is pointing to the next empty slot in the data queue 108. The d_hptr is then stored in the transaction queue slot corresponding to the enqueued transaction. The transaction queue slot is marked Valid once data corresponding to the enqueued transaction is transferred and stored in the data queue as in step 316. The Valid bit notifies the master logic 116 that this enqueued transaction may now be mastered as data for the transaction is available in the data queue 108.

Data for this new enqueued transaction continues to be received by the slave logic 112 and stored in the data queue 108 in step 316 until the initiator device 101 terminates (step 320), the data queue 108 becomes full (step 328), a predetermined address boundary is reached (step 324), or wait states are requested by either the initiator device 101 or by the slave logic 112 (step 332). If the initiator device 101 had not transferred all of its data when the connection with the bridge 100 was broken, then it will request a new transaction to transfer the remaining data. These "unfinished" enqueued transactions are only so from the point of view of the initiator. The bridge may, and normally will, attempt to master these in the order they were received.

The slave and master logic are designed to operate independently so as to allow an enqueued transaction to be slaved and mastered simultaneously. Where only a single enqueued transaction is being slaved and mastered simultaneously, i.e., new data is being received from the slave logic and stored in the data queue simultaneously with existing data being delivered from the data queue through the master logic, data streaming is said to be occurring. While streaming, the bridge is operating in its most efficient state, in effect being transparent, except for a delay, between the initiator and the target. New transaction data continues to be transferred from the slave logic into the data queue 108 until the bridge detects an error condition that stops the flow, such as a master abort or a target abort at the master logic 116. These particular error conditions may be due to an error in driving data on the target bus 113 (master abort) or due to an error encountered by the target device 103 while receiving the data (target abort). In both situations, the slave logic 112 is instructed to stop receiving data, and a termination reflecting the particular abort condition is signaled to the initiator device 101.

When either a master or target abort occurs, the current enqueued transaction being mastered is removed from the transaction queue 120, and the dq_outptr is set to point to the beginning of the data for the next enqueued transaction (if any). Thus, any remaining data for the enqueued transaction is discarded upon encountering such an abort. This makes additional space available in the data queue 108 for new transactions. Note that if a master or target abort occurs while multiple enqueued transactions are pending, then the bridge cannot notify the initiator by reflecting the abort back through the slave logic 112. This is because, by definition, when there are multiple enqueued transactions, there is no longer a connection with the initiator of an oldest enqueued transaction being mastered.

Transactions are mastered, according to an embodiment of the invention, as described with reference to FIGS. 5 and 6. Operation begins with step 402 where the master logic 116 selects the next slot in the transaction queue 120, pointed to by tq_hptr. In step 404, if the Valid bit for this, now current, slot (1) is set, then operation proceeds with step 408 in which the master logic 116 receives the selected transaction and control information. Otherwise, the bridge stays on the current slot until it becomes Valid. If both the current slot and the next slot (2) in the transaction queue 120 are Valid, then d_tptr is set to d_hptr_2, as in step 411. Otherwise, d_tptr is set to dq_inptr as in step 410. The dq_outptr is loaded with the value of d_hptr_1 obtained from slot 1 in the transaction queue 120, as in step 416. The master logic drives address and command (from the transaction information) onto the target bus 113 as in step 412. Operation then continues with step 418 where data for the enqueued transaction in slot (1) is forwarded from the data queue 108 at the current value of dq_outptr. The dq_outptr is updated, e.g., incremented or decremented, as data for the transaction in slot (1) is transferred through the master logic 116 and onto the target bus 113. Data continues to be delivered so long as d_tptr is not equal to dq_outptr. When d_tptr equals dq_outptr as decided in step 422, all data in the data queue 108 for the enqueued transaction in slot (1) has been transferred. Next, in step 426, if the bridge 100 is still connected to the initiator of the enqueued transaction in slot (1), then the bridge 100 may wait until additional data is received from the initiator and stored in the data queue 108 for the enqueued transaction in slot (1). Note that the additional data must be stored in the data queue 108, beginning at the current value of dq_inptr, before it can be delivered to the target bus 113.

Returning to decision step 426, if the bridge 100 is not connected to the initiator of the enqueued transaction in slot (1) when all of the transaction data has been delivered, either because the initiator has terminated or the slave logic 112 has disconnected, then the bridge 100 removes the enqueued transaction from slot (1) in the transaction queue 120 by, for instance, clearing a Valid bit associated with the slot. The above-described steps beginning with step 402 may be repeated for the next enqueued transaction in slot (2) of the transaction queue 120, and so on. Note that the bridge 100 has the ability to allow the data for a single third enqueued transaction, where older first and second transactions have been fully mastered and removed from the bridge, to occupy the maximum available space in the data queue 108.

To summarize, embodiments of the invention have been described including bridge logic capable of simultaneously processing a number of posted write transactions in the same direction, and allowing a data queue to be dynamically configured to store variable amounts of data depending on the needs of each transaction. The embodiments described above are, of course, subject to some variations in structure and implementation. For instance, although the operations in FIGS. 5 and 6 are shown to be connected sequentially, many can be performed out of sequence yet still permit the basic concept of handling multiple transactions simultaneously using a single, all purpose data queue. Also, the transaction and data queues may be implemented as part of the same integrated circuit memory unit. The bridge 100 as a whole may be implemented in hard-wired logic circuitry. An alternative implementation of the bridge and the functionality described above would be a processor having sufficiently high performance and executing a series of instructions that implement the above-described functionality. Although the figures show a bus-to-bus bridge for coupling a pair of physically separate buses, the bridge 100 may alternatively be the interface between a bus and internal chip circuitry, or it may be part of any chip circuitry that performs a bridging function as seen in conventional "chip sets" that form the heart of a computer motherboard. Finally, the embodiments of the invention described above may be modified to comply with bus specifications other than the PCI specification. It is intended that all such modifications and variations falling within the spirit and scope of the invention be covered by the appended claims.

What is claimed is:

1. A method of processing write transactions using a bridge, comprising:

storing first transaction information for a first transaction in a transaction queue of the bridge;

storing first transaction data for the first transaction in a data queue of the bridge;

storing second transaction information for a second transaction in the transaction queue, the transaction queue simultaneously containing the first and second transaction information; and storing second transaction data for the second transaction in the data queue, the data queue simultaneously containing the first and second data;

mastering the first and second transactions by delivering the first and second data from the data queue to first and second targets; and storing third transaction data for a third transaction in the data queue, the third data occupying the maximum available space in the data queue.

2. The method of claim 1 further comprising storing first and second data head pointers in the transaction queue in response to taking first and second values, respectively, of a data queue in pointer, the data queue in pointer indicating an available location in the data queue, the first and second data head pointers indicating a beginning of the first and second data, respectively, in the data queue.

3. The method of claim 1 wherein the step of:

mastering the first transaction is in response to capturing a value of a transaction queue head pointer, the transaction queue head pointer indicating an entry in the transaction queue corresponding to an oldest stored transaction.

4. The method of claim 2 further comprising updating a data queue out pointer as portions of said first data are transferred from the data queue to the first target, the data queue out pointer indicating the next portion of data in the data queue to be sent to the first target.

5. The method of claim 4 further comprising removing the first transaction from the transaction queue in response to the data queue out pointer matching a data tail pointer, the data tail pointer indicating the end of the first data in the data queue.

6. The method of claim 5 wherein the data tail pointer is derived from the second data head pointer.

7. A bridge comprising:

slave logic;

master logic;

a data queue having an input coupled to the slave logic and an output coupled to the master logic, and that simultaneously stores separate transaction data for each of one or more enqueued write transactions, the transaction data having been received through the slave logic to be forwarded through the master logic;

a transaction queue having an input coupled to the slave logic and an output coupled to the master logic, and that stores separate transaction information for each of the enqueued transactions; and a controller coupled to the transaction queue for managing access to the transaction and data queues in response to the transaction information, the bridge being further configured to allow the transaction data for a single enqueued transaction to occupy the maximum available space in the data queue.

8. The bridge of claim 7 wherein the enqueued transactions are posted write transactions.

9. The bridge of claim 7 wherein the controller further provides a data queue in pointer indicating an available location in the data queue for storing transaction data, the transaction queue further comprising first and second data head pointers associated with first and second enqueued transactions, the data head pointers taken in response to first and second values, respectively, of the data queue in pointer, the first and second data head pointers indicating a beginning of the first and second data, respectively, in the data queue.

10. The bridge of claim 7 wherein the master logic masters the enqueued transactions beginning with an oldest enqueued transaction as indicated by a transaction queue head pointer.

11. The bridge of claim 7 wherein the controller further provides a data queue out pointer indicating the next portion of data in the data queue to be sent through the master logic, the data queue out pointer being updated as portions of said transaction data are forwarded through the master logic.

12. The bridge of claim 9 wherein the first enqueued transaction is removed from the transaction queue in response to the data queue out pointer favorably comparing to a data tail pointer, the data tail pointer indicating the end of the first data in the data queue.

13. The bridge of claim 12 wherein the data tail pointer is derived from the data queue in pointer if there is a single enqueued transaction and from the second data head pointer if there is more than one enqueued transaction.

14. An electronic system comprising a first bus;

a second bus;

a processor coupled to the first bus;

a memory coupled to the second bus; and a bridge having slave logic coupled to the first bus and master logic coupled to the second bus, a data queue for simultaneously storing transaction data for each of a plurality of write transactions initiated by the processor and directed at the memory, a transaction queue for storing transaction information for each of the plurality of transactions, and a queue controller for associating, for each of the plurality of transactions, the transaction information with the transaction data, the bridge being further configured to allow the transaction data for a single enqueued transaction to occupy the maximum available space in the data queue.

15. The system of claim 14 wherein the transactions are posted write transactions.

16. The system of claim 13 wherein the controller further provides a data queue in pointer indicating an available location in the data queue for storing transaction data, the transaction queue further comprising first and second data head pointers associated with first and second enqueued transactions, the data head pointers taken in response to first and second values, respectively, of the data queue in pointer, the first and second data head pointers indicating a beginning of the first and second data, respectively, in the data queue.

17. The system of claim 13 wherein the transaction queue includes first and second data head pointers taken in response to first and second values of a data queue in pointer, the data queue in pointer indicating an available location in the data queue, the first and second data head pointers indicating a beginning of the first and second data, respectively, in the data queue.

* * * * *